UNITED STATES PATENT OFFICE

ERICH ECKOLDT, OF DRESDEN, GERMANY

PROCESS OF MAKING SODIUM FLUORIDE

No Drawing. Application filed July 18, 1927, Serial No. 206,796, and in Germany August 6, 1926.

It is known that sodium fluoride is produced by making hydrofluoric acid or fluosilicic acid respectively from sulphuric acid and raw materials containing fluorine and then producing from said acids sodium fluoride. These processes have many drawbacks. The greatest drawback consists in the fact that the sulphuric acid employed is converted into valueless sulphate of calcium. Another apparently simple process of making sodium fluoride by melting fluor spar with sodium carbonate has not been adapted as it is difficult and expensive to separate the sparingly soluble sodium fluoride from the residue of the melting.

On melting raw materials containing calcium fluoride with basic potassic compounds as for instance potassium carbonate or caustic potash, then, especially in the presence of silica (quartz, sand or the like) easily soluble potassium fluoride and insoluble calcium compounds are formed almost completely. Silica combines with the potassium carbonate or the caustic potash forming potassium silicate (soluble potash glass). Potassium fluoride is dissolved from the melt by means of water, the solution is filtered and by means of adding suitable sodium compounds, for instance sodium carbonate, sodium fluoride is precipitated. The potassium carbonate which is formed during this latter reaction with sodium carbonate, remains in solution and may be employed again for melting with fluor spar. A disadvantage of this process consists in the binding of much potassium compound by the silica contained in the melt, so that the large consumption of potassium compounds renders the process unprofitable. My invention obviates this difficulty by adding suitable fluorine compounds as hydrofluoric acid, fluosilicic acid or potassium silico fluoride to the solution obtained by dissolving the melt which contains for instance potassium fluoride, potassium silicate and potassium carbonate. The before mentioned fluorine compounds convert the potassium silicate into potassium fluoride. Thereby silica is precipitated and at the same time potassium fluoride remains in solution. The following equations represent the corresponding reactions:

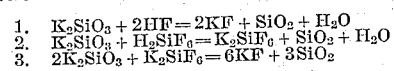

1. $K_2SiO_3 + 2HF = 2KF + SiO_2 + H_2O$
2. $K_2SiO_3 + H_2SiF_6 = K_2SiF_6 + SiO_2 + H_2O$
3. $2K_2SiO_3 + K_2SiF_6 = 6KF + 3SiO_2$

The potassium carbonate or the potassium hydroxide respectively contained in the solution are likewise converted by said fluorine compounds into potassium fluoride.

The before mentioned fluorine compounds employed in decomposing the potassium fluoride must be obtained from fluor spar by means of sulphuric acid; however, the calcium fluoride contained in the raw materials is converted, according to my invention, into sodium fluoride only by melting with the potassium compounds which may be regenerated and employed again in the melting of raw materials containing calcium fluoride.

On carrying out my process I mix for instance potassium carbonate with fluor spar adding so much silica that an easy and complete formation of potassium fluoride is obtained in the melt. If the fluor spar contains enough silica then it is not necessary to add silica. For instance I mix 100 parts of fluor spar, 1-20 parts of silica with 6 parts of potassium carbonate melting the mixture by heating it for 2 hours. After having cooled the mixture I wash it thoroughly with water, thereby dissolving potassium fluoride, potassium silicate and potassium carbonate. On testing a sample of the solution I decide how much hydrofluoric acid must be added in order to eliminate the silica, thereupon adding the quantity of hydrofluoric acid calculated to the solution. Then the solution is separated from the silica by means of filtration and a solution of potassium fluoride is obtained from which sodium fluoride is precipitated by adding sodium carbonate, potassium carbonate remaining in solution. The potassic solution is evaporated and the potassium carbonate is used again for producing sodium fluoride in the manner above described.

What I claim is:—

A process of making sodium fluoride from raw materials containing calcium fluoride consisting in mixing raw materials containing calcium fluoride with silica and melting them with potassium carbonate, washing the melt with water, separating silica from the solution obtained by adding potassium silica fluoride and adding sodium carbonate to the remaining solution of potassium fluoride after separating it from the precipitated silica.

In testimony whereof I affix my signature.

ERICH ECKOLDT.